United States Patent
Plottnik

(10) Patent No.: US 7,052,021 B2
(45) Date of Patent: May 30, 2006

(54) SEALING, TRIMMING AND FINISHING STRIPS AND VEHICLE DOORS INCORPORATING SUCH STRIPS

(75) Inventor: Reimund Plottnik, Viersen (DE)

(73) Assignee: GenCorp Property Inc., Sacramento, CA (US)

( * ) Notice: Subject to any disclaimer, the term of this patent is extended or adjusted under 35 U.S.C. 154(b) by 51 days.

(21) Appl. No.: 10/258,911

(22) PCT Filed: Apr. 10, 2001

(86) PCT No.: PCT/IB01/00622

§ 371 (c)(1),
(2), (4) Date: Jan. 7, 2003

(87) PCT Pub. No.: WO01/87658

PCT Pub. Date: Nov. 22, 2001

(65) Prior Publication Data

US 2004/0036234 A1    Feb. 26, 2004

(30) Foreign Application Priority Data

May 15, 2000  (GB) ................................ 0011679.8

(51) Int. Cl.
*B60J 10/08*    (2006.01)

(52) U.S. Cl. .................. 277/642; 277/644; 277/651; 277/921; 49/490.1; 296/146.9

(58) Field of Classification Search ............... 277/641, 277/642, 644, 651, 921; 49/377, 490.1; 296/146.7, 296/146.9
See application file for complete search history.

(56) References Cited

U.S. PATENT DOCUMENTS

| | | | | |
|---|---|---|---|---|
| 3,742,649 A | * | 7/1973 | Dochnahl | 49/441 |
| 3,766,697 A | * | 10/1973 | Jackson | 52/312 |
| 4,448,430 A | * | 5/1984 | Bright | 277/642 |
| 4,949,507 A | | 8/1990 | Vaughan | |
| 4,976,067 A | * | 12/1990 | Maass | 49/377 |
| 5,199,760 A | | 4/1993 | Vering | |
| 5,311,702 A | * | 5/1994 | Moore | 49/495.1 |

(Continued)

FOREIGN PATENT DOCUMENTS

DE     43 14 123 A1    11/1994

(Continued)

*Primary Examiner*—Alison K. Pickard
(74) *Attorney, Agent, or Firm*—Leydig, Voit & Mayer, Ltd.

(57) ABSTRACT

A vehicle door has inner and outer panel parts (5, 6) defining the hollow interior (16) of the door which supports a rigid frame (not shown) for a window glass (18) which slides into and out of the hollow interior (16) through a waist gap (20) formed by the upper marginal edges of the panel parts (5, 6). Inner and outer waist seals (22, 24) are mounted on the inner and outer panel parts (5, 6) for sealing against the window glass (18) along the waist gap (20). The outer waist seal (24) comprises flexible material (44), preferably extruded, which defines first and second channels (46, 48) facing in opposite directions. The first channel (46) embracingly grips the marginal edge of the outer panel part (6) to support the waist seal (24) in position. The second channel (48) embracingly grips interlocking legs of a decorative strip arrangement (56). The decorative strip arrangement (56) may comprise two separate parts (56A and 56B) presenting contrasting decorative appearances. The decorative strip arrangement (56) can thus be very easily mounted in position, and demounted, simply by clipping it into and unclipping if from the outer channel (48).

9 Claims, 2 Drawing Sheets

U.S. PATENT DOCUMENTS

| | | | |
|---|---|---|---|
| 5,358,764 A * | 10/1994 | Roberts et al. | 428/31 |
| 5,493,814 A * | 2/1996 | Christian | 49/479.1 |
| 5,622,008 A * | 4/1997 | King | 49/498.1 |
| 5,743,047 A * | 4/1998 | Bonne et al. | 49/490.1 |
| 5,775,030 A * | 7/1998 | Hamabata | 49/377 |
| 5,866,232 A * | 2/1999 | Gatzmanga | 428/122 |
| 5,870,860 A * | 2/1999 | Heller | 49/477.1 |
| 5,899,022 A * | 5/1999 | Gaw et al. | 49/377 |
| 6,070,363 A | 6/2000 | Vance | |
| 6,128,859 A | 10/2000 | Vance | |
| 6,141,854 A * | 11/2000 | Mueller et al. | 29/450 |
| 6,321,490 B1 * | 11/2001 | Vance | 49/377 |
| 6,409,251 B1 | 6/2002 | Kaye et al. | |

FOREIGN PATENT DOCUMENTS

| | | |
|---|---|---|
| DE | 298 07 479 U1 | 8/1998 |
| EP | 0 285 925 A2 | 10/1988 |
| EP | 0 441 073 A1 | 8/1991 |
| EP | 0441073 A1 * | 8/1991 |
| EP | 0 747 265 A1 | 12/1996 |
| EP | 0 822 109 A1 | 2/1998 |
| EP | 1388449 A1 * | 2/2004 |
| FR | 2718392 * | 10/1995 |
| GB | 2 046 338 A | 11/1980 |
| GB | 2 075 101 A | 11/1981 |
| GB | 2 125 474 A | 3/1984 |
| GB | 2 267 527 A | 12/1993 |
| GB | 2302120 * | 1/1997 |
| GB | 2 315 798 A | 2/1998 |
| JP | 2001-233060 * | 8/2001 |

* cited by examiner

SEALING, TRIMMING AND FINISHING STRIPS AND VEHICLE DOORS INCORPORATING SUCH STRIPS

FIELD AND BACKGROUND OF INVENTION

The invention relates to sealing, trimming and finishing strips and vehicle doors incorporating such strips.

BRIEF SUMMARY OF THE INVENTION

According to the invention, there is provided a sealing, trimming or finishing strip, comprising a channel extending along the length of the strip and adapted to grippingly receive a decorative member.

According to the invention, there is further provided a sealing, trimming or finishing strip for forming a waist seal on the door of a vehicle body to seal along a gap formed in the door through which a window glass carried by the door slides, the strip defining two side-by-side oppositely facing channels, a first one of which is adapted for embracingly gripping a panel part of the door and the second one of which is adapted for embracingly receiving a decorative strip arrangement.

According to the invention, there is also provided a vehicle door, comprising inner and outer panel parts for forming surfaces of the door on the inside and outside of the vehicle and together defining a hollow interior space for the door and carrying a window frame which receives a window glass slidable into and from the hollow interior space through a waist gap formed between marginal edges of the two panel parts, inner and outer waist seals carried by the marginal edges of the panel parts for sealingly contacting opposite surfaces of the slidable window glass, the outer waist seal being formed of flexible material defining first and second oppositely facing channels extending along the length of the waist seal, the first channel embracingly gripping the marginal edge of the outer door panel part to support the waist seal and the second channel grippingly receiving a decorative strip arrangement presenting a decorative surface facing outwardly of the door.

According to the invention, there is still further provided a sealing, trimming or finishing strip, comprising a first sealing part for contacting a movable surface to be sealed, a channel extending along the length of the strip for embracingly receiving part of an adjacent member, and a second sealing part mounted to be contacted by the adjacent member as the said part thereof enters the channel whereby to cause the second sealing part to be moved into at least partially embracing contact with the adjacent member.

According to the invention, there is also provided a vehicle door, comprising inner and outer panel parts for forming surfaces of the door on the inside and outside of the vehicle and together defining a hollow interior space for the door and carrying a window frame which receives a window glass slidable into and from the hollow interior space through a waist gap formed between marginal edges of the two panel parts and inner and outer waist seals carried by the marginal edges of the panel parts for sealingly contacting opposite surfaces of the slidable window glass, the inner waist seal being formed of flexible material defining first and second oppositely facing channels extending along the length of the waist seal, the first channel embracingly gripping the marginal edge of the inner door panel part to support the waist seal and the second channel grippingly receiving a first part of a trim panel and mounting it on the inside surface of the door, the flexible material of the inner waist seal carrying an extension which is contacted by a second part of the trim panel as the first part thereof is received by the second channel whereby to cause a flap part of the flexible material to pivot into contact over an edge of the trim panel.

BRIEF DESCRIPTION OF THE DRAWINGS

Sealing, trimming and finishing strips embodying the invention, and vehicle doors according to the invention and incorporating such strips, will now be described, by way of example only, with reference to the accompanying diagrammatic drawings in which.

DETAILED DESCRIPTION OF THE INVENTION

Figure 1:
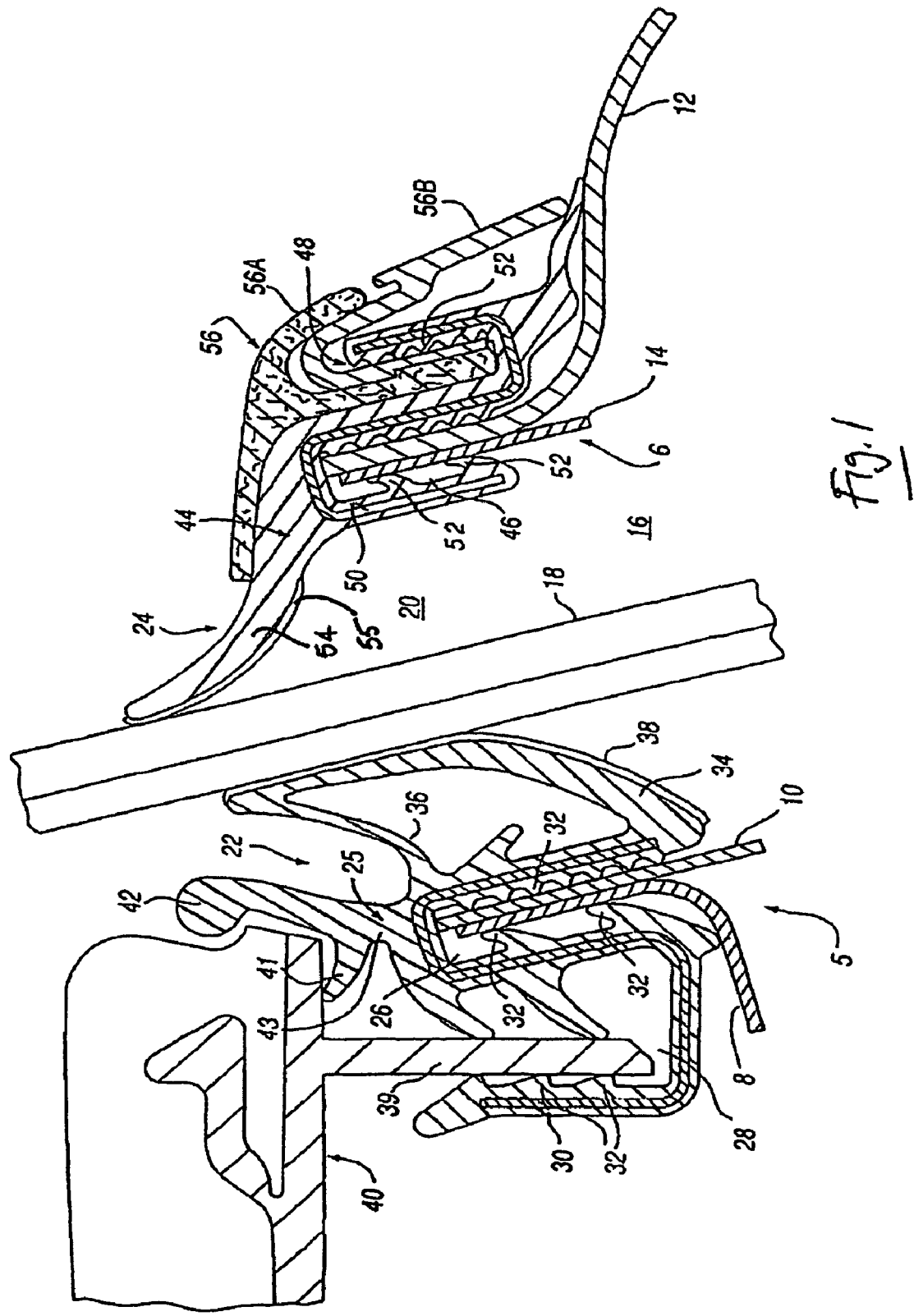
FIG. 1 is a cross-sectional view through part of a vehicle door in its "waist" region and showing one of the strips.

FIG. 1 shows a panel part 5 forming the face of a vehicle door on the inside of the vehicle body, and a panel part 6 forming the face of the vehicle door on the outside of the vehicle. The inner panel part 5 comprises metal panels 8 and 10 and the outer panel part 6 comprises metal panels 12 and 14. The inner and outer panel parts 5,6 define a hollow interior space 16 in the lower section of the vehicle door, into and out of which slidingly moves the window glass 18, which is supported in a rigid window frame (not shown) carried by the lower section of the door.

The window glass 18 slides into and out of the hollow space 16 through a gap 20 (the waist gap) between the upper margins of the panel parts 5,6. In order to provide weather-sealing at the waist gap 20, inner and outer waist seals 22 and 24 are provided.

The inner waist seal 22 comprises plastics, rubber or similar material 25, preferably produced by an extrusion process, which extends longitudinally of the waist gap 20 and is shaped to define a first channel 26 facing in one direction and a second channel 28 facing in the opposite direction. A reinforcing core or carrier 30 made of resilient material, such as metal, is embedded in the extruded material 25 and follows the shapes of the channels 26 and 28. The carrier 30 may be made of unapertured metal. Instead, the metal may be provided with slits or slots or it may comprise a series of double-U shaped metal elements connected together by integral connecting links or entirely disconnected from each other. Instead, looped wire may be used. Other forms of carrier, not necessarily made of metal, can be used.

As shown, the extruded material 25 defines lips 32 on the inside facing walls of the two channels. The lips 32 of the channel 26 make frictional gripping contact with opposite surfaces of the inner panel arrangement 5 and hold the inner waist seal firmly in position on the inside of the vehicle door. The gripping action of the lips 32 is accentuated by the resilience of the carrier 30.

The extruded material 25 of the inner waist seal 22 integrally carries a flexible sealing lip 34 which is supported by an integral flexible web 36. The flexible lip 34 has a surface 38, advantageously covered with flock or other low friction material, which sealingly bears against the inner face of the window glass 18 to provide sealing as the glass moves vertically upwards and downwards and to seal off the hollow interior 16 of the door. The hollow space defined within the lip 34 and the web 36 includes a small lip integrally extending into the hollow space from the extruded material 25.

The second channel 28 of the inner waist seal 22 grippingly receives a leg part 39 of a trim panel indicated generally at 40 which is carried on and covers the inner face of the vehicle door. The extruded material 25 extends upwardly forming a flap 42 which covers the marginal edge of the trim panel 40. As the leg part 39 of the trim panel 40 is pushed into the channel 28, the trim panel 40 contacts an extension 41 of the flap 42, forcing the flap 42 to pivot about a pivot point 43 so that the flap covers the edge of the trim panel 40.

The outer waist seal 24 is also formed from plastics, rubber, or similar flexible material 44, again preferably formed by an extrusion process. The material 44 defines channels 46 and 48 facing in opposite directions and incorporates a reinforcing core or carrier 50 which may have a construction similar to that of the carrier 30.

Channel 46 embraces the marginal edge of the outer panel part 6. Inwardly directed gripping lips 52 within the channel 46 (and generally similar to the gripping lips 32 of the inner waist seal 22) frictionally grip opposite surfaces of the panel part 6 and ensure that the outer waist seal 24 is therefore firmly supported on the outside of the waist gap 16. The outer waist seal 24 integrally defines a flexible lip 54 which has a surface 55 preferably carrying flock or other low friction material which is in sealing contact with the outer face of the window glass 18.

The outer channel 48 of the outer waist seal 24 grippingly supports a decorative strip arrangement 56. The decorative strip arrangement 56 comprises two separate members extending longitudinally along the length of the waist gap 20, comprising an upper curved member 56A which is relatively rigid and may be formed to present a bright finish. It may, for example, comprise polished metal or chromium-plated metal. It partially overlays the upper surface of the lip 54. The lower strip member 56B may be made of rigid plastics or similar material and presenting a contrasting colour, such as having a black finish. Both strip members 56A,56B carry legs which, in this example, are formed to interlock with each other and to be a tight frictional fit within the channel 48. As shown in the Figure, a series of small gripping lips 52 are arranged along one inner face of the channel 48 to help to secure the decorative strip arrangement 56 within the channel 48. However, gripping lips could be provided on both faces of the channel 48.

The extruded material 44 of the outer waist seal 24 includes a lower lip 58 which sealingly bears against the outer panel 12 of the door.

In this way, the outer waist seal 24 grippingly supports the decorative strip arrangement 56 which can thus be easily mounted in position, during assembly of the vehicle, simply by clippingly inserting the interlocking legs of the decorative strip arrangement into the second channel 48 of the waist seal. The use of separate clips or other fastenings is no longer necessary.

The decorative strip arrangement 56 can have any suitable shape, colour or finish. Although FIG. 1 shows a decorative strip arrangement comprising two separate strip members 56A and 56B with contrasting finishes, this is not essential: other forms of decorative strip arrangement can be used instead, including strip arrangements comprising only a single strip member.

Figure 2:
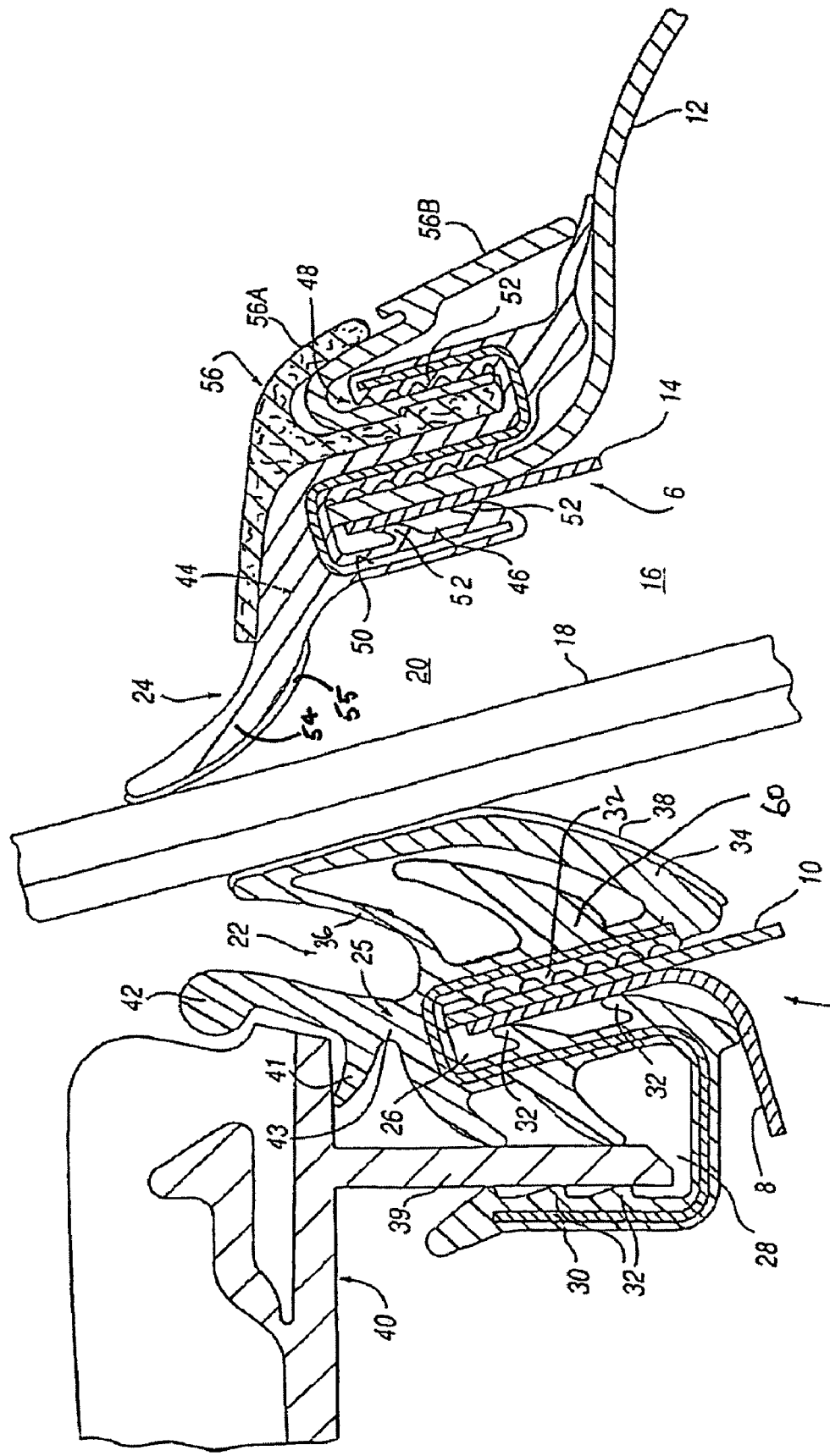
FIG. 2 shows a modified form of the strip of FIG. 1.

In the strip shown in FIG. 2, similar items are similarly referenced. In the strip of FIG. 2, the small lip inside the hollow space defined by the lip 34 and the web 36 is enlarged as shown at 58 and helps to prevent rattling of the glass 18.

The invention claimed is:

1. A waist seal for a door of a vehicle body to seal along a waist gap formed in the door through which a window glass carried by the door slides, the door having a panel part with opposite sides, the waist seal comprising:
   a decorative strip arrangement including a decorative surface and a generally linear leg extending from the decorative surface,
   a sealing strip defining first and second side-by-side oppositely facing channels,
   the first channel being adapted for embracingly gripping the panel part of the door and having first and second sides for being positioned at the opposite sides of the panel part,
   a lip made of flexible material and integrally extending from the first side of the first channel for sealingly contacting the window glass,
   the second channel positioned on the second side of the first channel and being adapted for receiving the leg of the decorative strip arrangement,
   wherein the first channel includes a reinforcing member for extending around the panel part of the door,
   wherein said leg extends into the second channel generally parallel to the reinforcing member in a region of the panel part of the door along substantially the entire length of the leg, and
   wherein the decorative surface overlies the first and second sides of the first channel and at least partially overlies the lip where the lip extends from the first side of the first channel.

2. A strip according to claim 1, wherein the decorative strip arrangement when received in the second channel also extends towards the panel part of the door.

3. A strip according to claim 1, wherein the decorative strip arrangement comprises two separate parts of contrasting appearance.

4. A strip according to claim 3, wherein the two parts of the decorative strip arrangement define interlocking legs grippingly received in the second channel.

5. A strip according to claim 1, in combination with the door which comprises inner and outer panel parts forming surfaces of the door on the inside and outside of the vehicle and between marginal edges of which panel parts the waist gap is defined, the first channel embracingly gripping the marginal edge of the outer door panel part whereby the strip forms an outer waist seal.

6. A strip according to claim 5, including an inner waist seal comprising flexible material defining a channel for embracingly gripping the marginal edge of the inner panel part of the door for mounting the inner waist seal in position in which part of the flexible material sealingly bears against the window glass.

7. A strip according to claim 6, wherein the flexible material of the inner waist seal is reinforced with a reinforcing core or carrier.

8. A sealing, trimming or finishing strip for forming a waist seal on a door of a vehicle body to seal along a waist gap formed in the door through which a window glass carried by door slides, the strip defining first and second side-by-side oppositely facing channels, the first channel being adapted for embracingly gripping a panel part of the door, a lip made of flexible material and integrally extending from the first channel for sealingly contacting the window glass, the second channel being adapted for embracingly receiving a decorative strip arrangement, wherein the decorative strip arrangement when received in the second channel at least partially overlies a surface of the lip, wherein the decorative strip arrangement comprises two separate parts of contrasting appearance, and wherein the two parts of the decorative strip arrangement define interlocking legs grippingly received in the second channel.

9. A waist seal for a door of a vehicle body to seal along a waist gap formed in the door through which a window glass carried by the door slides, the door having a panel part, the waist seal comprising:
- a decorative strip arrangement including a decorative surface and a generally linear leg extending from the decorative surface,
- a sealing strip defining first and second side-by-side oppositely facing channels,
- the first channel being adapted for embracingly gripping the panel part of the door,
- a lip made of flexible material and integrally extending from the first channel for sealingly contacting the window glass,
- the second channel being adapted for receiving the leg of the decorative strip arrangement,
- wherein the first channel includes a reinforcing member for extending around the panel part of the door,
- wherein said leg extends into the second channel generally parallel to the reinforcing member in a region of the panel part of the door along substantially the entire length of the leg,
- wherein the decorative strip arrangement comprises two separate parts of contrasting appearance, and
- wherein the two parts of the decorative strip arrangement define interlocking legs grippingly received in the second channel.

* * * * *